United States Patent [19]

Papageorgiou

[11] 4,302,491
[45] Nov. 24, 1981

[54] HAIR SIMULATING FIBER

[75] Inventor: Dimitri G. Papageorgiou, Athens, Greece

[73] Assignees: George Papageorgiou, Ann Arbor, Mich.; Paul Papageorgiou, Athens, Greece; part interest to each

[21] Appl. No.: 849,340

[22] Filed: Nov. 7, 1977

[51] Int. Cl.³ .............................................. B32B 15/02
[52] U.S. Cl. .................................... 428/15; 428/379; 428/397; 428/401; 427/409; 132/5; 132/53; 132/56
[58] Field of Search ............... 428/15, 375, 378, 383, 428/397, 400, 401, 379; 132/5, 7, 53, 56; 46/172

[56] References Cited
U.S. PATENT DOCUMENTS 3,790,434 2/1974 Sone et al. .................... 428/401 X
3,955,587 5/1976 Dunn et al. ......................... 132/53

Primary Examiner—Marion McCamish
Assistant Examiner—Beverly Johnson
Attorney, Agent, or Firm—Barnes, Kisselle, Raisch & Choate

[57] ABSTRACT

A composite hair simulating fiber with characteristics similar to human hair which includes a metallic core member coated with a plastic material to form a fine strand, the core member and/or the coating member being flattened to provide a strand which will have a curling characteristic with a self-retaining form which can be readily styled by an operator to provide various curves and convolutions as desired similar to that capable in human hair but with greater extension and retention properties.

4 Claims, 12 Drawing Figures

HAIR SIMULATING FIBER

This invention relates to a Hair Simulating Fiber with characteristics similar to the human hair and more particularly to a synthetic fiber which can be used for wigs or hair-pieces or any other head covers to simulate human hair.

In the history of hair styling, the curling or waving or any other shape of the hair, which by nature is straight (that is of an absolutely round cross section), has been accomplished by flattening the normally round cross-section of the hair by the use of water or liquids since by wetting, the keratin softens and thus may be curled. This is a temporary form of flattening, for the keratin has a tendency to return to its normal round cross-section when dry. Also, by the use of heat or by chemicals, the hair may be flattened and therefore curled as desired by the hair stylist.

In other words, hair which is naturally straight, that is, a full cylinder, not hollow, and not flattened, and composed of a keratin substance, cannot be curled or waved unless previously subjected to:

(a) wetting, so that it will soften, thus losing its absolute cylindrical shape and its rigidity, and once flattened, it will take a desired shape, that is, curls, waves, etc., or (b) flattening the keratin cylinder in some way mechanically or chemically.

With the evaporation of the liquid (by which the hair was set), the full keratin cylinder becomes rigid again, retaining the given shape, until its natural tendency to return to its original cylindrical form neutralizes little by little the newly obtained form.

There are, however, certain physical limitations in the possibilities of styling the human hair in the conventional manner in regard to the extent and the volume of the styling; thus, any upstanding styles of natural hair have to be supported by mechanical means, that is, pad insertions and the like which will cause the hair to take shapes and be retained to positions which could not be achieved utilizing the natural qualities and flexibility.

The same conditions apply in connection with wigs and hair-pieces of every form and shape made of human hair. Following the usual procedures to alter the shape and achieve a desired style requires time and expense. The same procedure is followed for every restyling which, of course, results in additional time and expense.

As regards the wigs or hair-pieces or any other similar hair covers, made of synthetic fibers such as nylon, etc., restyling is rather restricted, due to the cross-sectional shape already given during its manufacture, and the limits of change are similar to that of the human hair. In addition, alteration of the shape as originally manufactured is not an available expedient.

In accordance, therefore, with the above, the object of the present invention is to provide a synthetic fiber which can be utilized in wigs, hair-pieces or any other forms of head covers or substitutes, to present hair styles varying from the simplest to the most sophisticated, from ornate to the most daring ones. The extent and possibilities of styling, in regard to their conception and presentation, very much surpass any present achievements, and provide the possibility for the creation of new forms of hair styles, which could not possibly be obtained utilizing only the properties and possibilities of the human hair or the previously available synthetic fibers. In other words, the present invention gives a new dimension to hair styling.

In the present invention, however, a strand is formed of a coating member consisting of known materials supported by an inner axis, the core member, and the external plasticity of the hair is achieved by a special process such that the strand is able to retain a shape and be altered to any desired hair style, waves or curls, etc. or to retain or release a curl, according to the desire of the hair stylist.

It is, therefore, an object to provide a composite fiber or strand simulating the human hair which has a core or axis member capable of being treated in such a way as to have a tendency for curling combined with the possibility of straightening and having also an alterable cylindrical coating which will function in cooperation with the core to provide the desired adaptability to hair styling.

The composite strand provides the necessary plasticity but will also retain an imparted shape and permit the creation of hair styles in a variety, extent and height which are not achievable with human hair or presently available artificial or synthetic fibers.

Other objects and features of the invention relating to details of the composition and construction of the invention, together with a description of the invention and specifications relating to the practice thereof will be found in the following description and claims which are presented in connection with the best mode presently contemplated for the practice of the invention.

DRAWINGS accompany the disclosure and the various views thereof may be briefly described as:

Figure 11:

FIG. 11 does not represent a hair style but illustrates the possibilities of the strand of the present invention with respect to extension and self-retention.

Before starting a detailed description, it may be well to define certain terms.

1. Core Member with Metallic Properties

The axis or core member for the strand to be described is preferably circular in cross-section and not hollow and consists of a metal or a metal alloy formed of copper, silver, aluminum, or a combination of metal and plastic or synthetics, having the metallic properties of copper, and silver, and so forth with respect to flexibility, malleability and the ability to form retention.

2. Unprocessed or Raw Strand

This term is utilized to signify a core and coating member, each of which retains its cylindrical form and which may have elasticity and malleability and the property of retaining its various forms, but it lacks the necessary characteristics to serve for the creation of hair styles and, accordingly, lacks the simulation of response to combing and so on which can be applied as indicated later.

3. Processed Strand

The term "processed strand" is utilized to mean a strand which apart from coloring and so forth has been subjected to a flattening action so that the cross-section of the core and the coating member is taking a form desired which will give the necessary plasticity accompanied by grace and movement and which acquires a particular sensitivity to respond to the influence of the hair stylist and simulate the human hair without temporary or permanent waving. This particular strand can be either curled or returned to straight form by the hair stylist.

Figure 1:
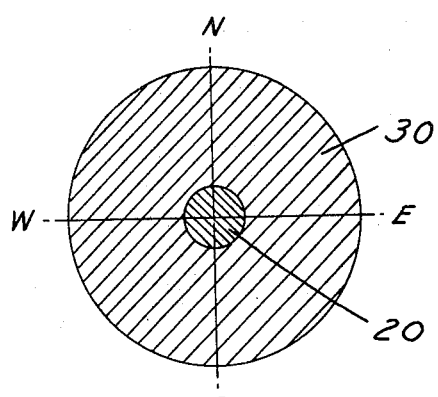
FIG. 1 is a view of a sectional hair strand formed in accordance with the present invention shown in its original form.

WITH REFERENCE TO THE DRAWINGS:

In FIG. 1, the raw hair strand is shown in its initial form with a core 20 and a coating 30. The core member 20, which is circular in cross-section, is preferably made of metal or metal alloy as indicated above such as copper, silver, aluminum and so forth or a combination of metal and plastic or synthetics having metallic properties similar to those of copper or silver, for example. By metallic properties, we mean an untempered strand, the cross-section of which is circular in form. This core will have elasticity, malleability and property of form retention such as, for example, copper which can take various forms.

The diameter of the core member preferably should be within a range of about 20 to 30 microns but could be a little less or a little over this range. Another way of defining the diameter of the wire or core is that which would be equal to the diameter of a silver wire of 18 meters in length having a total weight of 1/10 of a gram. As indicated, this core can be obtained from a variety of sources of metal wire and may carry its natural color or have a color applied to it which can be visible if so desired through the transparent coating 30 when applied on it.

The coating material 30 on the core as shown in FIG. 1 can be a synthetic material in the form of various plastics, acrylic resins, nylons, Teflons or other synthetic compositions which can be applied by submerging the core in a liquid bath of material required or it can be applied by an extrusion process. The covering can be transparent or colored or tinted to any desired shade.

If the color of the core is to be utilized as the basic color, the coating will be transparent or a combination of the colored core and a colored translucent coating may be utilized. The total diameter of the coating should preferably be less than that of the human hair and varies from a range of about 400 microns to about 500 microns with variations in either direction. The coloring of the coating material can be achieved in ways which are known in the art of coloring of plastic materials.

Figure 8:
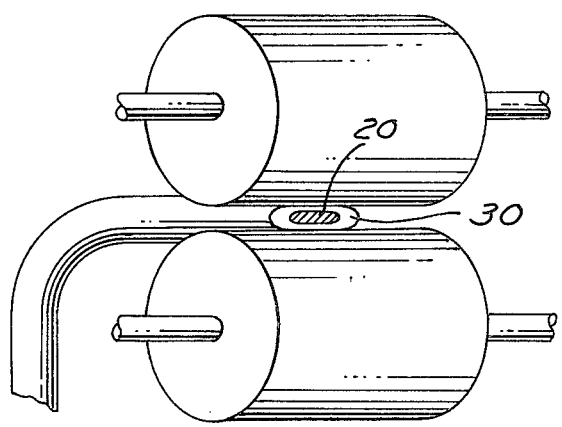
FIG. 8 illustrates diagrammatically the manner in which the rollers can apply pressure to a strand to flatten it to the desired shape.
Figure 8A:
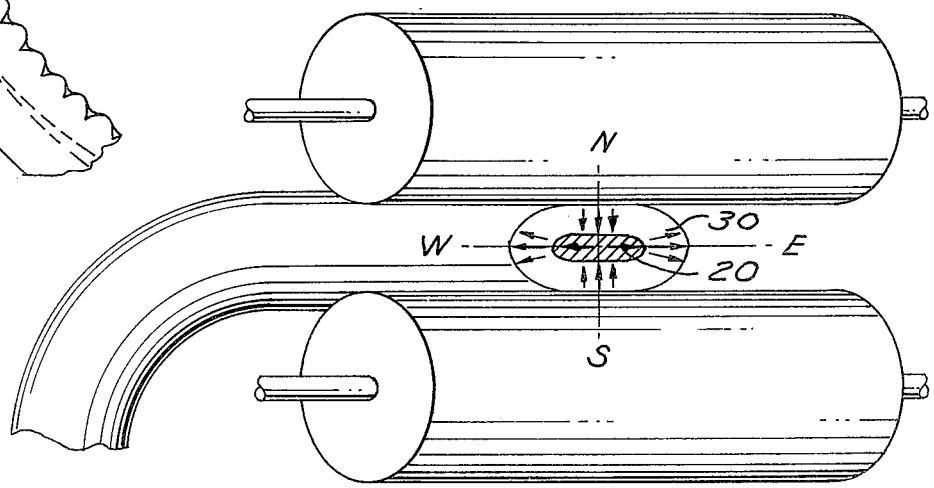
FIG. 8A is an enlarged view of FIG. 8 illustrating the direction of the forces.
Figure 9:
FIG. 9 illustrates the possibilities of retention relative to human hair.

The raw strand as described above with the cylindrical core and cylindrical coating is of little use in hair-pieces since it does not have the right characteristics. It is necessary to process the strand in a manner to flatten the core or the core and the coating. This is most simply accomplished by rolling of the raw strand between pressure rollers such as shown in FIGS. 8 and 8A. The purpose of the flattening is to achieve a characteristic in the processed strand which makes it particularly adaptable to use in hair-pieces where it can be subjected to various stylings and will have a workable characteristic amenable to the operations of the hair stylist and a stability which renders it particularly useful for this purpose.

Figure 2:
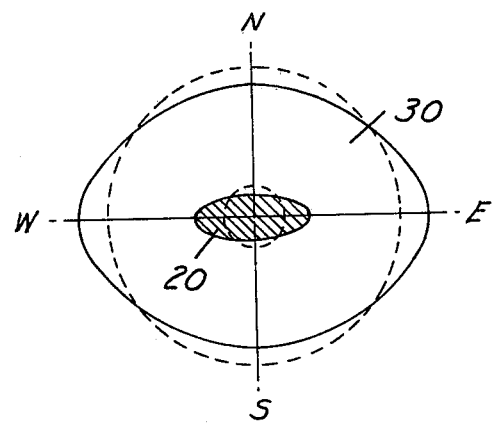
FIGS. 2, 3, 4 and 5 illustrate various forms which the original strand may take depending on the manner in which it is treated by rolling.

In FIG. 2, a first flattening operation is shown wherein the core 20 becomes oval in shape and the coating 30 is slightly distorted to become obloid approaching an elliptical shape. In other words, the flattening of the core produces an effect on the coating which changes the cylindrical cross-section to an out-of-round shape generally referred to as "oval" which can be taken to mean egg-shaped or ellipsoidal.

Figure 3:
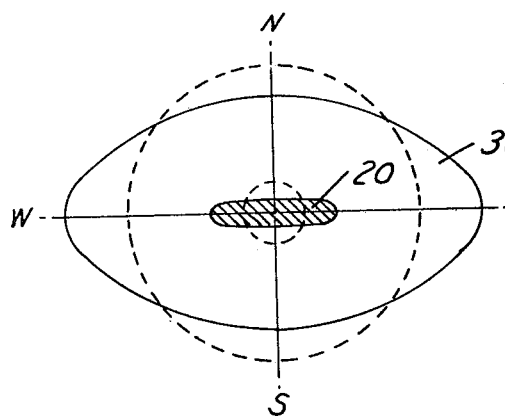

FIG. 3 shows a greater degree of flattening of the core 20 with a larger oval characteristic of the covering so that the East-West axis is considerably longer than the North-South axis.

Figure 4:
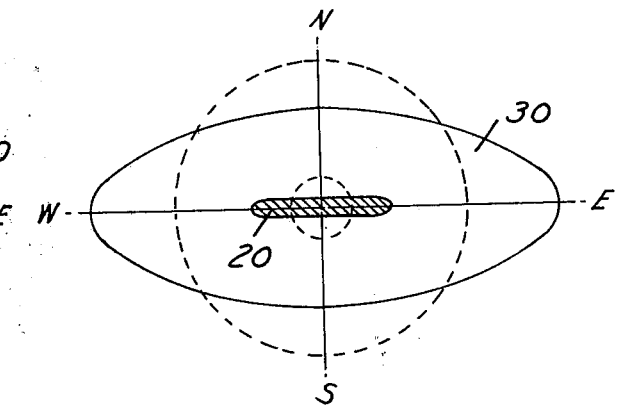
Figure 5:
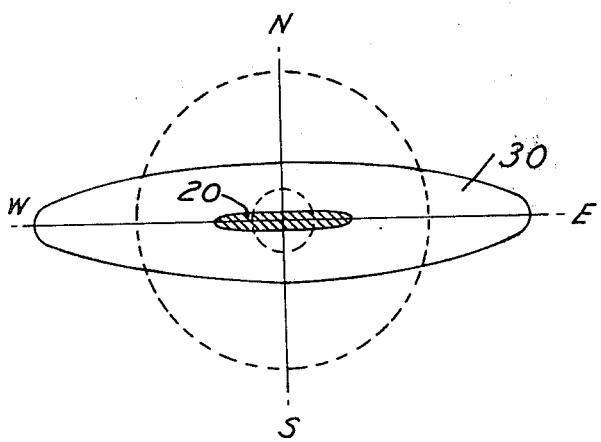

In FIG. 4, this flattening is to an even greater degree. This flattening, as indicated, is accomplished by passing the raw strand between the rollers shown in FIG. 8 which may or may not be heated. If the rollers are heated, the flattening of the coating material would be to a greater degree than with the use of cold rollers. The pressure, of course, applies through the outer coating to the central core causing it to flatten as shown by the vertical arrows in FIG. 8A while it expands horizontally as shown by the East-West arrows in FIG. 8A. The core member, of course, is malleable and will flatten under its pressure and retain its flattened configuration and this, of course, causes the cylindrical form of the outer member to change from a circular configuration partly by reason of the pressure applied by the rollers externally and partly because of the change of shape of the core which exerts forces on the coating which causes it to attain an out-of-round condition. Once the core is flattened, it attains a degree of stability of shape which it retains throughout its normal life.

It will be appreciated that the coating material is generally of a plastic which has a long memory and, therefore, it tends to return to its original form even though restrained by the change of shape of the core. The greater the degree of flattening, the greater the degree of tendency of the resulting process strand to curl.

Figure 6:
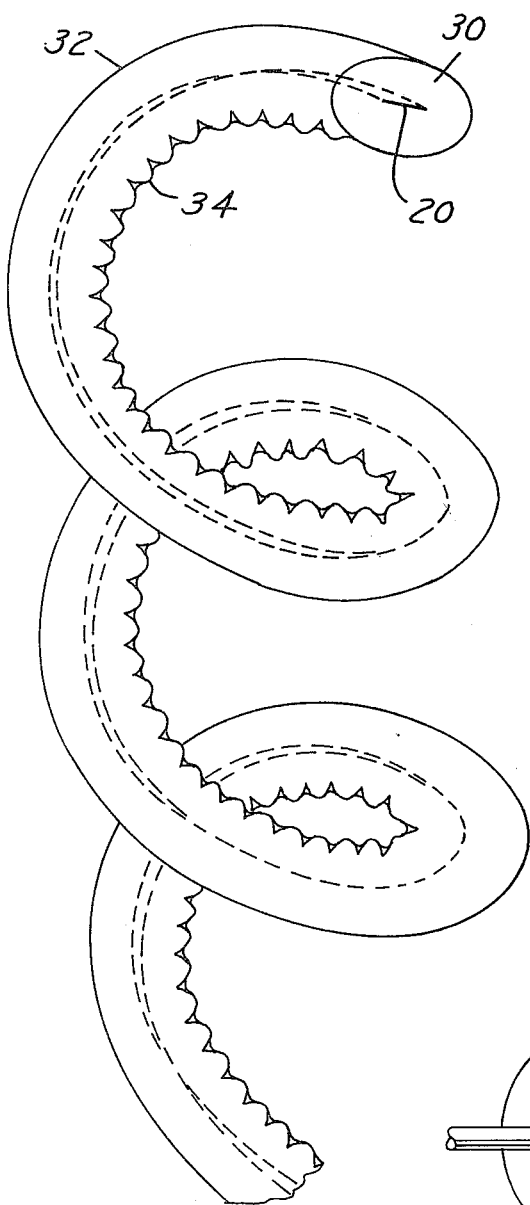
FIG. 6 illustrates the manner in which a flattened strand may be curved to provide a curl.

In FIG. 6, a curled strand is shown, there being a stretching of the outer portion of the curves and the compressing of the inner portion of the curves as indicated by the shading. The core 20 again has the coating 30 and the outer portion of the coating at 32 will be stretched while the inner portion will be compressed and slightly wrinkled as shown at 34. This, of course, is a highly magnified presentation and would not normally be visible to the naked eye.

It will be readily appreciated that various characteristics of curling can be obtained by changing the degree of pressure and the resultant flattening of the core and the coating.

Figure 7:
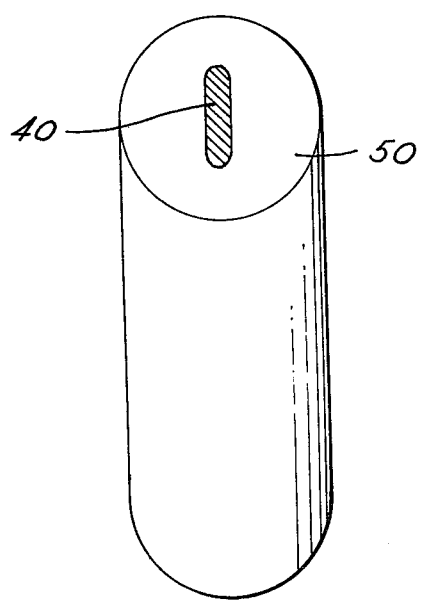
FIG. 7 illustrates a modification in which a flattened core has a cylindrical coating in the original manufactured form.

In FIG. 7, a modified structure is shown in which the core 40 is initially formed as a flattened piece of metal and then covered with a layer of coating 50 which is essentially round. The characteristic of the outer coating can then be changed by running it through rollers with the degree of heating which would be necessary to change the circular cross-section to a desired oval cross-section. If desired, additional flattening of the basic flat core could also be achieved.

It is significant, with reference to FIG. 6 and the other figures, that the tendencies of the core member to curl and retain its original curling shape is inherent because of the nature of the core material while there is a reverse tendency on the part of the coating member since it will resist or reduce the degree of curling of the core member. Accordingly, the flattening of the strand as above described gives the combination of two opposite forces which tend to neutralize each other, namely, the tendency of the metallic core to curl and the tendency of the plastic coating to resist this curling. This creates a characteristic feel which is very similar to that of human hair. The flatter the core, the greater the tendency to curl; and the more circular the coating, the greater the tendency to resist this curling. Various degrees, therefore, of the countervailing tendencies of the core and the coating can then be accomplished as shown in the FIGS. 2, 3, 4 and 5 with a maximum resistance in FIG. 7 on the part of the coating while the flat core would readily curl.

It is preferable that the coating material having the same characteristics of an elastic plastic such as nylon or Teflon is bonded to the core member in such a way as to prevent the slipping of the coating on the core. This improves the stability of the resultant strand. In addition, the flattening process assists in the connection of the core to the coating member due to the great pressure exerted internally from the core to the coating member with the resultant extension of both members to the East-West axis as shown in FIG. 8A. Thus, as indicated, the tendencies of the coating can be utilized to neutralize the reaction between the core and the coating as described below. If, for example, a core member without any covering is flattened, it becomes very sensitive. A simple combing action along its length increases its sensitivity to curling and, in general, its bending. If now we cover the core member with the circular covering of the coating 30, then its behavior changes. From the moment of covering the core, the composite strand has the previously defined tendency to curl with the cylindrical covering 30 resisting this curling action. Thus, the composite strand after being processed, that is, flattened provides a completely different behavior characteristic.

The combination of the core tendency to curl and the resisting action of the coating member provides a neutralization which gives the processed strand a high degree of natural form and behavior which compares with human hair and greatly assists the hair dresser. Thus, it is possible to obtain a balance between the central core and the covering. It is, of course, desirable to have the central core as thin and light as possible while still obtaining the desired balance between the tendency of the core to curl and the neutralizing action of the coating member. The resulting strand can be combed by a hair stylist to achieve the desired results.

The possibility of utilizing varying temperatures on the rollers has been mentioned. The cold rollers can be used to reach a maximum degree of flattening of the core member while minimizing the flattening effect on the coating which provides the balance required between the curling capacity of the core and the resultant characteristics of the coating. If warm rollers are used, the maximum flattening of the core and the coating would result which would provide a high degree of curling capacity.

Figure 10:
FIG. 10 illustrates the possibilities of retention relative to strands of the present invention.

FIG. 10 shows the possibilities of hair styling. The arrows A indicate a portion which shows the approximate possibilities of human hair after a preparatory process before the final hair style, for example, wetting and heating of the use of chemicals in connection with a permanent wave process. Arrows B indicate the possibilities of the processed strand with self-retention and extension as compared with human hair as well as any other type of fiber. The portions indicated at C simply show the curvature of processed strands and the comparative difference with the natural hair curve at A.

The illustration in FIG. 11 is not intended to show a hair style per se from an aesthetic point of view, but it shows the possibilities of the processed strands and to what height and extension the strand can take while being self-retained, this exceeding by far all the present possibilities of synthetic fibers or natural hair. Thus, FIG. 11 illustrates the possibilities of a new dimension in hair styling. FIG. 11 also illustrates that grouped individual process strands can be formed into shapes which will be self-retained and do not lose their shape either by the force of gravity or by the normal movements of the head.

It will thus be seen that the processed strands utilized in the making of a wig for human hair can permit the achievement of exceptional hair styles but also permits styling from one style to another by the hair dresser so that the purchaser of the hair-piece is not locked in to any particular hair style.

What is claimed as new is as follows:

1. A strand for use as simulated hair having self-retaining characteristics for use in a hairpiece or a wig or any other similar or related head cover or ornament which comprises:
   (a) a core member in the form of a fine metal wire ranging in diameter from about 20 to about 30 microns, and
   (b) a coating on said core having the characteristics of a flexible plastic, the diameter of the coating being in the vicinity of 400 to 500 microns,
   (c) said coating being radially stressed transversely on one axis of said core member to a greater degree than on the axis perpendicular to said one axis.

2. A strand for use as simulated hair having self-retaining characteristics for use in a hairpiece or a wig or any other similar or related head cover or ornament which comprises:
   (a) a core member in the form of a fine metal wire having a cross-section with major and minor axes, the dimension of the major axis being greater than in the minor axis, and
   (b) a coating on said core having the characteristics of a flexible plastic, said coating being stressed in the direction of the major axis to a greater degree than in the direction of the minor axis,
   (c) said core being flattened from a round cross-section wherein said coating is stretched radially by said flattened core to a corresponding flattened shape,
   (d) said core member ranging in diameter from about 20 to about 30 microns, and said coating having a diameter in the vicinity of 400 to 500 microns.

3. A strand for use as simulated hair having self-retaining characteristics for use in a hairpiece or a wig or any other similar or related head cover or ornament which comprises:
   (a) a core member in the form of a fine metal wire having a cross-section with major and minor axes, the dimension on the major axis being greater than in the minor axis, and (b) a coating on said core having the characteristics of a flexible plastic, said coating being stressed in the direction of the major axis to a greater degree than in the direction of the minor axis, (c) said core being bonded to said coating and said core being flattened from a round cross-section wherein said coating is stretched radially by said flattened core to a corresponding flattened shape, (d) said core member ranging in diameter from about 20 to about 30 microns, and said coating having a diameter in the vicinity of 400 to 500 microns.

4. A method of forming a strand for use as simulated hair having self-retaining characteristics for use in a hairpiece or wig or any other similar or related head cover or ornament which comprises:

(a) the step of coating a fine untempered wire with a plastic material to provide a composite strand, (b) the step of applying lateral pressure to said strand to flatten the core wire in a first transverse cross-sectional direction and elongate said wire in a second cross-sectional direction normal to said first direction and simultaneously producing a stress on said coating said second cross-sectional direction, and (c) said wire having a diameter ranging from about 20 microns to about 30 microns and said coating having a diameter in the vicinity of 400 to 500 microns.

* * * * *